Nov. 16, 1948.  D. I. GIBB  2,454,054
EGG POACHER
Filed May 24, 1947
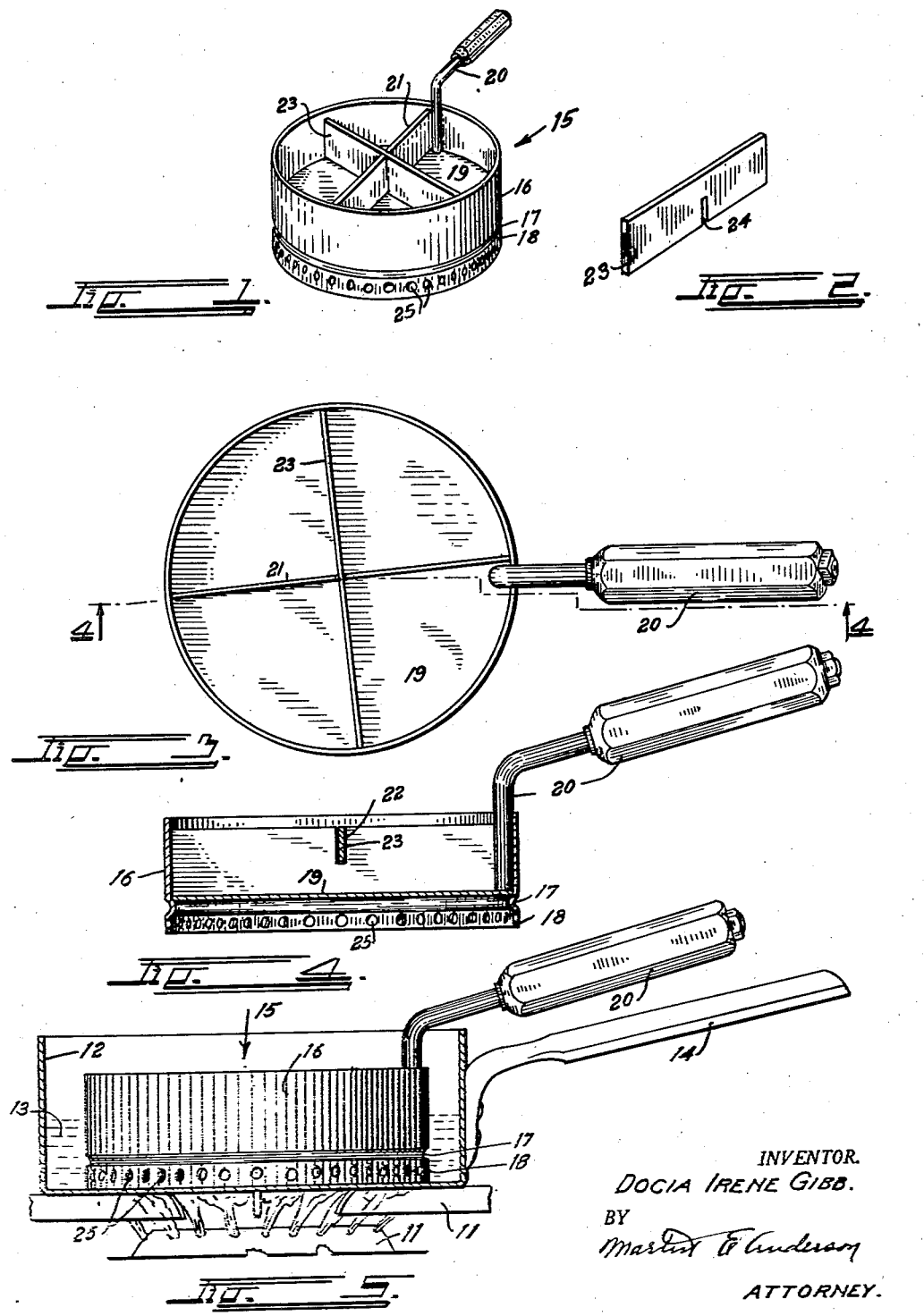
INVENTOR.
DOCIA IRENE GIBB.
BY
ATTORNEY.

Patented Nov. 16, 1948

2,454,054

UNITED STATES PATENT OFFICE 2,454,054

EGG POACHER

Docia Irene Gibb, Denver, Colo.

Application May 24, 1947, Serial No. 750,283

3 Claims. (Cl. 99—449)

This invention relates to improvements in egg poachers.

For different reasons, many persons want their eggs poached or coddled in preference to being boiled or fried or shirred.

Poached eggs are quite extensively used and are often prepared without the use of any special apparatus, the egg shell being broken and the contents dropped into boiling water. This method is simple, but is also objectionable because the white of the egg usually breaks giving the egg a ragged appearance.

Inventors have recognized the above objection and have provided devices of various kinds for use in poaching eggs to improve their appearance, such devices usually comprise small dishes or pans having a plurality of depressions of a size to receive the white and yolk and such dishes or pans are then immersed in boiling water until the eggs are cooked.

Many people find that eggs which have been cooked in boiling water are not so easily digested as when they are coddled or cooked in water just below the boiling point.

It is an object of this invention to produce a device for use in poaching eggs which shall be of a simple and substantial construction and of such a size that it can be used for either a single egg or any number up to four and even as many more as desired.

It is a further object of this invention to produce an egg poacher of the type indicated which, when placed in a pan of boiling water, will prevent the water in the poacher from reaching the boiling point, and thus assures that the eggs that are cooked therein will not be subjected to heat above the boiling point of water at that altitude.

A further object of the invention is to produce a device in which the eggs, after they have been cooked, can be easily and quickly removed to a dish for serving.

And a still further object of the invention is to produce a device of such a construction that it can be packed in a container of comparatively small size so as to facilitate transportation and handling.

The above and other objects that may become apparent as this description proceeds are attained by means of a construction and an arrangement of parts that will now be described in detail and for this purpose reference will be had to the accompanying drawing in which the invention has been illustrated in its preferred form, and in which:

Figure 1 is a perspective view of the device which forms the subject of this invention;

Figure 2 is a perspective view of a separator plate showing the same removed from the device;

Figure 3 is a top plan view looking into the device and showing the parts in assembled position;

Figure 4 is a section taken on line 4—4, Figure 3; and

Figure 5 is a view showing a water containing pan in diametrical section and a poaching device in position therein.

Referring now to the drawing, reference numeral 10 designates the grid of a gas stove and reference numeral 11 a gas burner. Supported on the grid is a pan 12 containing a quantity of water, the latter having been indicated by reference numeral 13. The pan is provided with a handle 14 in the usual manner.

The egg poaching device which forms the subject of this invention, has been shown as positioned in pan 12 and has been designated in its entirety by reference numeral 15. The poaching device consists of a ring 16 of sheet metal preferably stainless steel or aluminum. It can also, of course, be made from other material such as copper, brass or tin. In the actual construction the ring has a height of approximately two inches and a diameter of six inches. The dimensions may, of course, be altered as desired. Ring 16 is provided with an inwardly extending rib 17 which is positioned about one-half an inch above the lower edge of the ring. That part of the ring between the rib or inwardly extending bead 17 is provided with a large number of perforations 18 for a purpose which will hereinafter appear. Supported on the upper surface of the inwardly extending bead is a circular metal plate 19 having a handle 20 secured thereto near its periphery. The diameter of plate 19 is slightly less than the interior diameter of the ring, but larger than the smallest diameter between the surfaces of the bead so that it will be supported by the latter when in position as shown in Figures 1 and 4. A partition 21 extends diametrically across the upper surface of the plate and is secured to the latter by welding, soldering, or in any other suitable manner, so as to form a substantially integral part thereof. This partition is permanently attached and is not intended to be removed. At the middle point of partition 21, there is a notch 22 that extends downwardly substantially one-half its width as shown in Figure 4. The partition just described divides the area of plate 19 into two equal parts. A removable partition 23 like that shown in Figure 2 is furnished and provided at its middle point with a notch 24 of a depth substantially one-half its width. Partition 23 may be positioned at right angles to partition member 21 with the notch embracing the lower half thereof so as to form a rectangular assembly that divides the area of the plate into four equal parts.

When one or more eggs are to be poached, and for the purpose of this explanation, it will be considered that four eggs are to be poached at one time. Ring 16 is positioned in the pan and the water is brought to the boiling point. Plate 19, with its partition members 21 and 23, is now inserted into ring 16 and rests on the upwardly turned surfaces of beads 17. When plate 19 is in position, any steam generated below this plate will pass outwardly through one or more of the openings 25. No steam will pass upwardly through the water inside of the ring 16 because the contact between the flanges of this ring and the bead are sufficiently tight to offer considerable resistance to the passage of steam, as a result of this, the water inside of the ring does not boil, even when the water surrounding the ring is boiling violently. Eggs are now broken into the four compartments and allowed to remain a sufficient length of time to cook them to the extent desired. The time required for cooking will, of course, vary with the boiling point of water at different altitudes, and is usually determined by the appearance of the egg, based upon experience. When the eggs have been cooked, the plate 19, together with the eggs are lifted bodily from the interior of the ring, the handle 20 being employed for this purpose. After the plate with the eggs thereon has been removed from the water, the cooked eggs can be removed into a dish or to a plate by merely inclining the plate 19 and employing an ordinary table knife or a spoon to get the egg moving, if it should require this.

It is, of course, preferable to put a sufficient amount of salt in the water to give the egg the proper flavor.

It has already been pointed out above that by means of this device the eggs are cooked in water that is below the boiling point and therefore emerge very tender and with a flavor different from that which they would have if cooked in boiling water. The eggs have a taste resembling coddled eggs as distinguished from eggs that have been poached in boiling water.

Where only two eggs are cooked at a time, the separator 23 may be omitted, however, since the plate is usually large enough to take care of four eggs, the four compartments may be employed, even if only a single one is used. The handle 20 is preferably connected with the plate in such a manner that it can be easily removed and therefore when the device is packed for shipment and transportation, the handle is laid on top of the partitions and within the area of ring 16. It will be observed that the upper edges of the partitions are a short distance under the upper edge of ring 16 and the water in which the device is immersed should not extend any higher than the upper edges of the partitions.

Having described the invention what is claimed as new is:

1. An egg poaching device comprising, a short cylindrical ring of sheet metal provided on its inner surface with means for supporting a round plate, a round plate supported thereby, the material of the ring below the plate having a plurality of openings through which steam may escape, the upper surface of the plate having a partition plate extending thereacross on a diameter, the partition plate having a downwardly extending notch at its middle point, and an upwardly ranging handle for removing the plate from the ring, the handle having one end attached to the plate.

2. An egg poaching device comprising, a combination, a short cylindrical ring having an inwardly extending bead above the lower edge thereof, the material below the bead being foraminated, an imperforate plate resting on the upper surface of the bead, forming a closure, the upper surface of the plate having a diametrical partition plate positioned in a plane substantially perpendicular thereto, and a handle attached to the plate for removing it from the ring.

3. An egg poaching device comprising, in combination, a short cylindrical ring having an inwardly extending bead above the lower edge thereof, the material below the bead being foraminated, a plate resting on the upper surface of the bead forming a closure, the upper surface of the plate having a diametrical partition plate positioned in a plane substantially perpendicular thereto, said partition having a narrow notch extending downwardly at a point substantially midway between its ends, another partition plate having a notch at its middle point, adapted to be positioned in the notch in the first mentioned partition, and a handle having one end connected with the plate, the other end being accessible for removing the plate from the ring.

DOCIA IRENE GIBB.

No references cited.